US011293350B2

(12) United States Patent
Yoshida et al.

(10) Patent No.: US 11,293,350 B2
(45) Date of Patent: Apr. 5, 2022

(54) SEAL SEGMENT AND ROTARY MACHINE

(71) Applicant: Mitsubishi Hitachi Power Systems, Ltd., Yokohama (JP)

(72) Inventors: Azumi Yoshida, Tokyo (JP); Hidekazu Uehara, Tokyo (JP); Shin Nishimoto, Yokohama (JP); Naoya Tatsumi, Yokohama (JP); Kohei Ozaki, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 36 days.

(21) Appl. No.: 16/097,692

(22) PCT Filed: Apr. 21, 2017

(86) PCT No.: PCT/JP2017/016078
§ 371 (c)(1),
(2) Date: Oct. 30, 2018

(87) PCT Pub. No.: WO2017/195575
PCT Pub. Date: Nov. 16, 2017

(65) Prior Publication Data
US 2019/0162120 A1 May 30, 2019

(30) Foreign Application Priority Data

May 9, 2016 (JP) .............................. JP2016-093906

(51) Int. Cl.
*F02C 7/28* (2006.01)
*F04D 29/10* (2006.01)
(Continued)

(52) U.S. Cl.
CPC ................ *F02C 7/28* (2013.01); *F01D 11/00* (2013.01); *F01D 11/001* (2013.01);
(Continued)

(58) Field of Classification Search
CPC ................ F16J 15/3288; F16J 15/3292; F05B 2240/572; F05B 2240/571; F01D 11/001; F05D 2240/57; F05D 2240/59
(Continued)

(56) References Cited

U.S. PATENT DOCUMENTS 6,343,792 B1 2/2002 Shinohara et al.
6,874,788 B2 * 4/2005 Kono .................... F16J 15/3292
277/355

(Continued)

FOREIGN PATENT DOCUMENTS

EP 3 457 007 A1 3/2019
JP 3692300 B2 9/2005
(Continued)

OTHER PUBLICATIONS

International Search Report dated Jul. 4, 2017, issued in counterpart International Application No. PCT/JP2017/016078, with English translation (3 pages).

(Continued)

*Primary Examiner* — Eugene G Byrd
(74) *Attorney, Agent, or Firm* — Westerman, Hattori, Daniels & Adrian, LLP

(57) ABSTRACT

A seal segment (11) includes a retainer (21), a seal body (13) having a thin plate seal piece (20), a high-pressure side plate (23), a low-pressure side plate, a retainer simulating section (51) further extending in the circumferential direction (Dc) from an end portion of the retainer (21) in the circumferential direction (Dc), and a block body (50) including a seal body simulation section (53) extending inward in the radial direction (Dr) from the retainer simulation section. The high-pressure side plate (23) and the low-pressure side plate cover at least a part of the seal body simulation section (53) of the block body (50).

19 Claims, 9 Drawing Sheets

(51) Int. Cl.
  *F16J 15/3252* (2016.01)
  *F16J 15/3292* (2016.01)
  *F01D 11/00* (2006.01)
  *F01D 11/02* (2006.01)
  *F16J 15/3288* (2016.01)

(52) U.S. Cl.
  CPC ............ *F01D 11/003* (2013.01); *F01D 11/02* (2013.01); *F04D 29/10* (2013.01); *F16J 15/3252* (2013.01); *F16J 15/3288* (2013.01); *F16J 15/3292* (2013.01)

(58) Field of Classification Search
  USPC ..... 277/411, 412, 347, 355, 421; 415/174.2, 415/173.4
  See application file for complete search history.

(56) References Cited

U.S. PATENT DOCUMENTS

| | | | | |
|---|---|---|---|---|
| 7,226,053 B2* | 6/2007 | Nakano | ............... | F16J 15/4472 277/355 |
| 7,261,515 B2* | 8/2007 | Nishimoto | ........... | F16J 15/3292 277/355 |
| 7,413,194 B2* | 8/2008 | Wright | ............... | F16J 15/3288 277/355 |
| 7,828,297 B2* | 11/2010 | Hoebel | ............... | F16J 15/3292 277/355 |
| 8,025,296 B2* | 9/2011 | Uehara | ................... | F01D 11/00 277/355 |
| 8,100,406 B2 | 1/2012 | Wright | | |
| 8,152,462 B1* | 4/2012 | Williams | ............. | F16J 15/3292 277/355 |
| 8,220,802 B2* | 7/2012 | Rhodes | ............... | F16J 15/3292 277/412 |
| 8,250,756 B2* | 8/2012 | Adis | ................... | F16J 15/3292 277/355 |
| 8,262,349 B2* | 9/2012 | Turnquist | ............ | F01D 11/025 277/412 |
| 8,382,120 B2* | 2/2013 | Deo | ....................... | F01D 11/02 277/355 |
| 8,474,827 B2* | 7/2013 | Grondahl | ................ | F01D 11/02 277/411 |
| 9,103,223 B2 | 8/2015 | Uehara et al. | | |
| 2002/0105146 A1* | 8/2002 | Uehara | ................ | F16J 15/3292 277/355 |
| 2003/0068224 A1* | 4/2003 | Uehara | ................ | F16J 15/3292 415/170.1 |
| 2004/0256810 A1* | 12/2004 | Nakano | ................ | F16J 15/3292 277/402 |
| 2008/0042366 A1* | 2/2008 | Awtar | ................... | F01D 11/003 277/411 |
| 2008/0048399 A1* | 2/2008 | Nicholson | ............ | F01D 11/001 277/355 |
| 2008/0265514 A1* | 10/2008 | Mortzheim | ............ | F01D 11/00 277/303 |
| 2008/0309018 A1 | 12/2008 | Williams | | |
| 2009/0309311 A1* | 12/2009 | Verma | ................... | F16J 15/3292 277/411 |
| 2009/0315272 A1 | 12/2009 | Kasahara et al. | | |
| 2010/0024592 A1* | 2/2010 | Maurin-Perrier | ......................... | B23K 26/0624 74/640 |
| 2010/0247309 A1* | 9/2010 | Ambrosy | ............. | F01D 11/001 415/230 |
| 2011/0148046 A1* | 6/2011 | Jahn | ...................... | F16J 15/3292 277/412 |
| 2011/0316237 A1* | 12/2011 | Uehara | ................ | F01D 11/001 277/413 |
| 2012/0007318 A1 | 1/2012 | Lee et al. | | |
| 2012/0261884 A1* | 10/2012 | Uehara | ................ | F16J 15/3292 277/411 |
| 2013/0181412 A1* | 7/2013 | Shinohara | ............ | F16J 15/3292 277/500 |
| 2016/0334020 A1 | 11/2016 | Ozaki et al. | | |

FOREIGN PATENT DOCUMENTS

| | | |
|---|---|---|
| JP | 2008-128276 A | 6/2008 |
| JP | 2008-261489 A | 10/2008 |
| JP | 2008-261498 A | 10/2008 |
| WO | 2008/004590 A1 | 1/2008 |
| WO | 2010/146805 A1 | 12/2010 |
| WO | 2015-115400 A1 | 8/2015 |

OTHER PUBLICATIONS

Written Opinion dated Jul. 4, 2017, issued in counterpart Application No. PCT/JP2017/016078, with English Translation (10 pages).

* cited by examiner

SEAL SEGMENT AND ROTARY MACHINE

TECHNICAL FIELD

The present invention relates to a seal segment and a rotary machine.

Priority is claimed on Japanese Patent Application No. 2016-093906, filed May 9, 2016, the content of which is incorporated herein by reference.

BACKGROUND ART

A shaft seal device is provided around a rotor in a rotary machine such as a gas turbine and a steam turbine to reduce an amount of leakage of working fluid flowing from a high-pressure side to a low-pressure side. As an example of a shaft seal device, for example, a shaft seal device described in the following Patent Document 1 is known.

The shaft seal device includes a housing provided in a stator, a seal body made up of a plurality of thin plate seal pieces, and a high-pressure side plate and a low-pressure side plate which are divided into a plurality of plates in a circumferential direction of the rotor and provided to extend along the high-pressure side and the low-pressure side of the seal body. The low-pressure side plate and the high-pressure side plate restrict the flow of the working fluid to small gaps between the thin plate seal pieces, and create a flow in which the thin plate seal pieces are liable to be raised.

CITATION LIST

Patent Literature

Patent Document 1
Japanese Unexamined Patent Application, First Publication No. 2008-128276

SUMMARY OF INVENTION

Technical Problem

However, in the separate parts of the high-pressure side plate and the low-pressure side plate, because it is difficult for the shaft seal device to restrict the flow of the thin plate seal pieces to the small gap, in some cases, the floating performance of the thin plate seal pieces deteriorates or fluttering occurs in the thin plate seal pieces.

The present invention provides a seal segment and a rotary machine capable of reducing deterioration in performance with respect to floating characteristics of the thin plate seal pieces and fluttering occurring in the thin plate seal pieces.

Solution to Problem

A seal segment according to a first aspect of the present invention includes a retainer extending in a circumferential direction of a rotary shaft on an outer circumferential side of the rotary shaft, and a seal body extending inward in a radial direction from the retainer and having a plurality of thin plate seal pieces laminated in the circumferential direction.

The seal segment of the first aspect further includes a high-pressure side plate which is supported to be sandwiched between the seal body and the retainer and covers a high-pressure side in an axial direction of the seal body over the circumferential direction, and a low-pressure side plate which is supported to be sandwiched between the seal body and the retainer and covers a low-pressure side in the axial direction of the seal body over the circumferential direction.

The seal segment of the first aspect further includes a block body including a retainer simulation section extending further in the circumferential direction from an end portion of the retainer in the circumferential direction and a seal body simulation section extending inward in the radial direction from the retainer simulation section.

In the seal segment of the first aspect, the high-pressure side plate and the low-pressure side plate cover at least a part of the seal body simulation section of the block body.

In this aspect, the seal segment enhances the resistance to fluttering of the thin film seal piece, while maintaining a flow in which the thin seal piece easily floats, at a location in which fluttering easily occurs. Therefore, the seal segment can suppress performance deterioration of floating characteristics of the thin plate seal piece and fluttering occurring in the thin plate seal piece.

According to the seal segment of a second aspect, in the seal segment of the first aspect, the seal body simulation section has a plurality of thicknesses of the thin plate seal piece in the circumferential direction.

In this aspect, the seal body simulation section is thicker in the circumferential direction Dc than the thin plate seal piece and has high rigidity. Therefore, abrasion in the separating part between the seal segments is reduced, and fluttering occurring at the thin plate seal piece can be suppressed.

According to the seal segment of a third aspect, in the seal segment of the first or second aspect, the seal body simulation section includes a contact seal extending inward in the radial direction.

In this aspect, the gap between the inner end of the contact seal body simulation section in the radial direction and the rotary shaft is filled.

According to the seal segment of a fourth aspect, in the seal segment of the third aspect, the contact seal includes a brush seal.

In this aspect, the seal segment can provide a seal with high conformability to axial deviation of the rotary shaft.

According to the seal segment of a fifth aspect, in the seal segment of one of first to fourth aspects, the seal body simulation section is divided into a main seal body simulation section and an auxiliary seal body simulation section by a slit extending inward in the radial direction.

In this aspect, the seal segment can deform the auxiliary seal body simulation section to conform to the behavior of the thin plate seal piece.

According to the seal segment of a sixth aspect, in the seal segment of the fifth aspect, the seal body simulation section includes an elastic member between the main seal body simulation section and the auxiliary seal material simulation section.

In this aspect, the seal segment can adjust the auxiliary seal body simulation section to follow the behavior of the thin plate seal piece.

A rotary machine according to the rotary machine of a seventh aspect includes the seal segment any one of the first to sixth aspects.

In this aspect, the seal segment can suppress performance deterioration of the floating characteristics of the thin plate seal piece in the seal segment of the rotary machine and fluttering occurring in the thin plate seal piece.

Advantageous Effects of Invention

The seal segment and the rotary machine described above can suppress the performance deterioration of the floating characteristics of the thin plate seal piece and the fluttering occurring in the thin plate seal piece.

DESCRIPTION OF EMBODIMENTS

Hereinafter, various embodiments of the present invention will be described with reference to the drawings.

First Embodiment

Hereinafter, the first embodiment of the present invention will be described in detail. In the present embodiment, an example in which a shaft seal device 10 is applied to a gas turbine (a rotary machine) 1 is shown.

Figure 1:
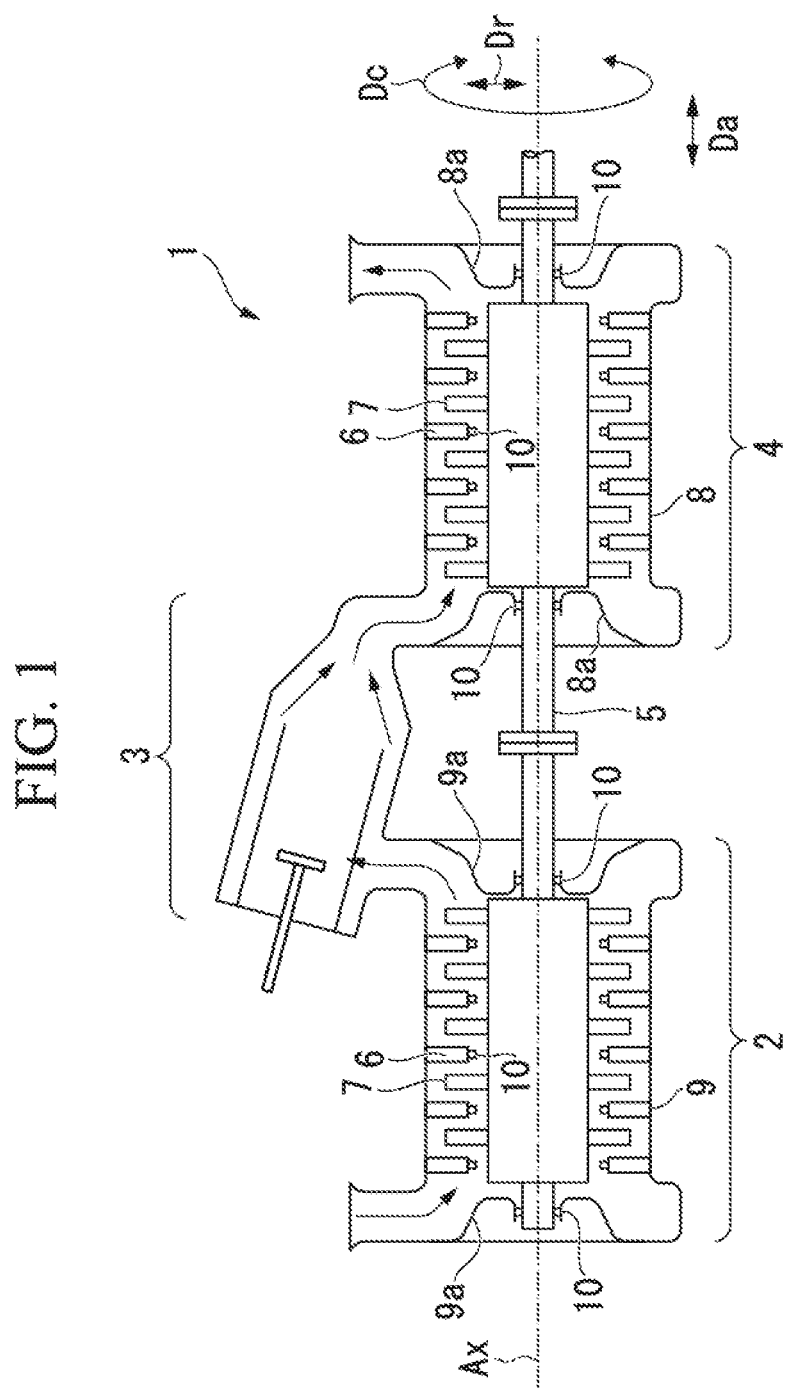
FIG. 1 is a schematic overall configuration diagram of a gas turbine (a rotary machine) according to a first embodiment of the present invention.

The gas turbine 1 shown in FIG. 1 has a compressor 2 that takes in and compresses a large amount of air, and a combustor 3 that mixes fuel with the air compressed by the compressor 2 and combusts the mixture. The gas turbine 1 further has a rotating turbine 4, and a rotor 5 (a rotary shaft) that transmits a part of the rotating power of the turbine 4 to the compressor 2 to rotate the compressor 2.

A combustion gas generated in the combustor 3 is introduced into the turbine 4, and thermal energy of the combustion gas is converted into rotational energy to rotate the turbine 4.

In the following description, a direction in which an axis Ax of the rotor 5 extends is defined as an "axial direction Da," a circumferential direction of the rotor 5 is defined as a "circumferential direction Dc," a radial direction of the rotor 5 is defined as a "radial direction Dr," and a rotational direction of the rotor 5 is defined as a "rotational direction Bc."

In the gas turbine 1 having the above-described configuration, the turbine 4 converts thermal energy of the combustion gas into mechanical rotational energy to generate power by blowing the combustion gas to the turbine blades 7 provided on the rotor 5. In addition to the plurality of turbine blades 7 on the rotor 5 side of the turbine 4, a plurality of turbine vanes 6 are provided on a casing 8 side of the turbine 4, and the turbine blades 7 and the turbine vanes 6 are arranged alternately in the axial direction Da.

The turbine blades 7 receive the pressure of the combustion gas flowing in the axial direction Da to rotate the rotor 5 around the axis, and the rotational energy applied to the rotor 5 is used by being taken out from a shaft end Between the turbine vanes 6 and the rotor 5, the shaft seal device 10 is provided as a shaft seal for reducing the leakage amount of combustion gas leaking from the high-pressure side to the low-pressure side.

The compressor 2 is coaxially connected to the turbine 4 by the rotor 5, compresses outside air using the rotation of the turbine 4, and supplies the compressed air to the combustor 3. Like the turbine 4, in the compressor 2, a plurality of turbine blades 7 are provided on the rotor 5 and a plurality of turbine vanes 6 are provided on the casing 9 side of the compressor 2, and the turbine blades 7 and the turbine vanes 6 are alternately arranged in the axial direction Da. Furthermore, the shaft seal device 10 for reducing the leakage amount of compressed air leaking from the high-pressure side to the low-pressure side is also provided between the turbine vanes 6 and the rotor 5. Further, a shaft seal device 10 for preventing the compressed air and the combustion gas from leaking from the high-pressure side to the low-pressure side is provided even in the bearing portion 9a in which the casing 9 of the compressor 2 supports the rotor 5 and the bearing portion 9b in which the casing 8 of the turbine 4 supports the rotor 5

The shaft seal device 10 according to the present embodiment is not limited to application to the gas turbine 1. For example, the shaft seal device 10 can be widely adopted in general rotary machines that convert energy into work by rotation of a shaft and flow of a fluid, like a large-scale fluid machine such as a steam turbine, a compressor, a water wheel, a refrigerator and a pump. In this case, the shaft seal device 10 can also be widely used to suppress the flow of the fluid in the axial direction Da.

Figure 2:
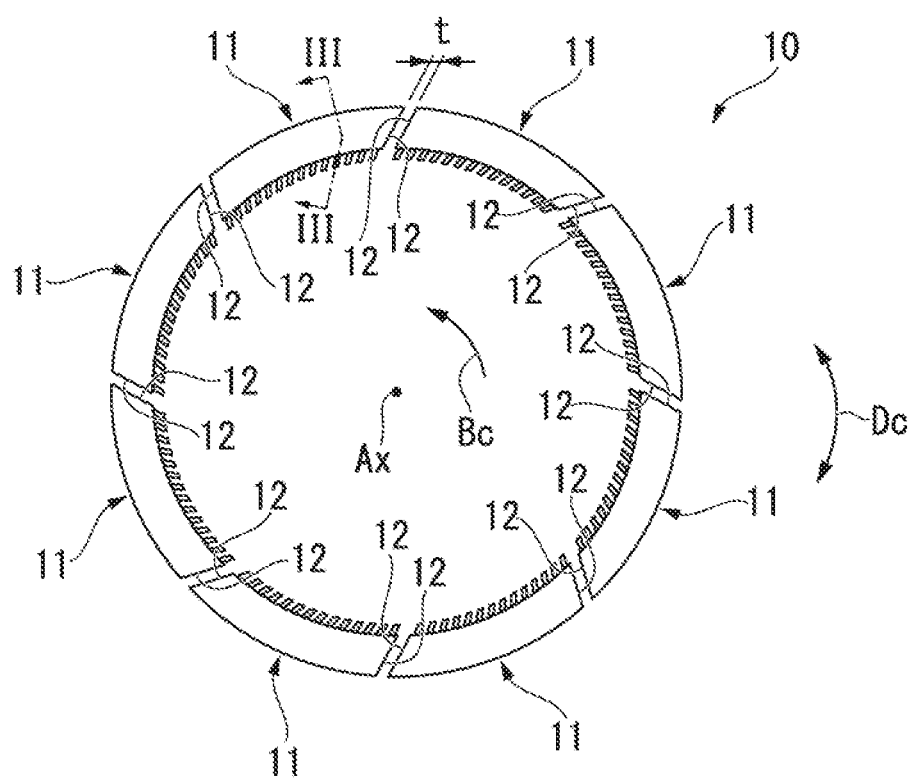
FIG. 2 is a schematic configuration diagram of a shaft seal device according to the first embodiment of the present invention.

Next, the configuration of the shaft seal device 10 provided in the gas turbine 1 configured as described above will be described with reference to the drawings. FIG. 2 is a diagram as seen from the axial direction Da. As shown in FIG. 2, the shaft seal device 10 includes a plurality of (eight in the present embodiment) seal segments 11 extending in a circular arc shape. The plurality of seal segments 11 are annularly disposed in the circumferential direction Dc. A gap t is formed between the circumferential end portions 12 and 12 of adjacent seal segments 11 disposed in this manner.

Figure 3:
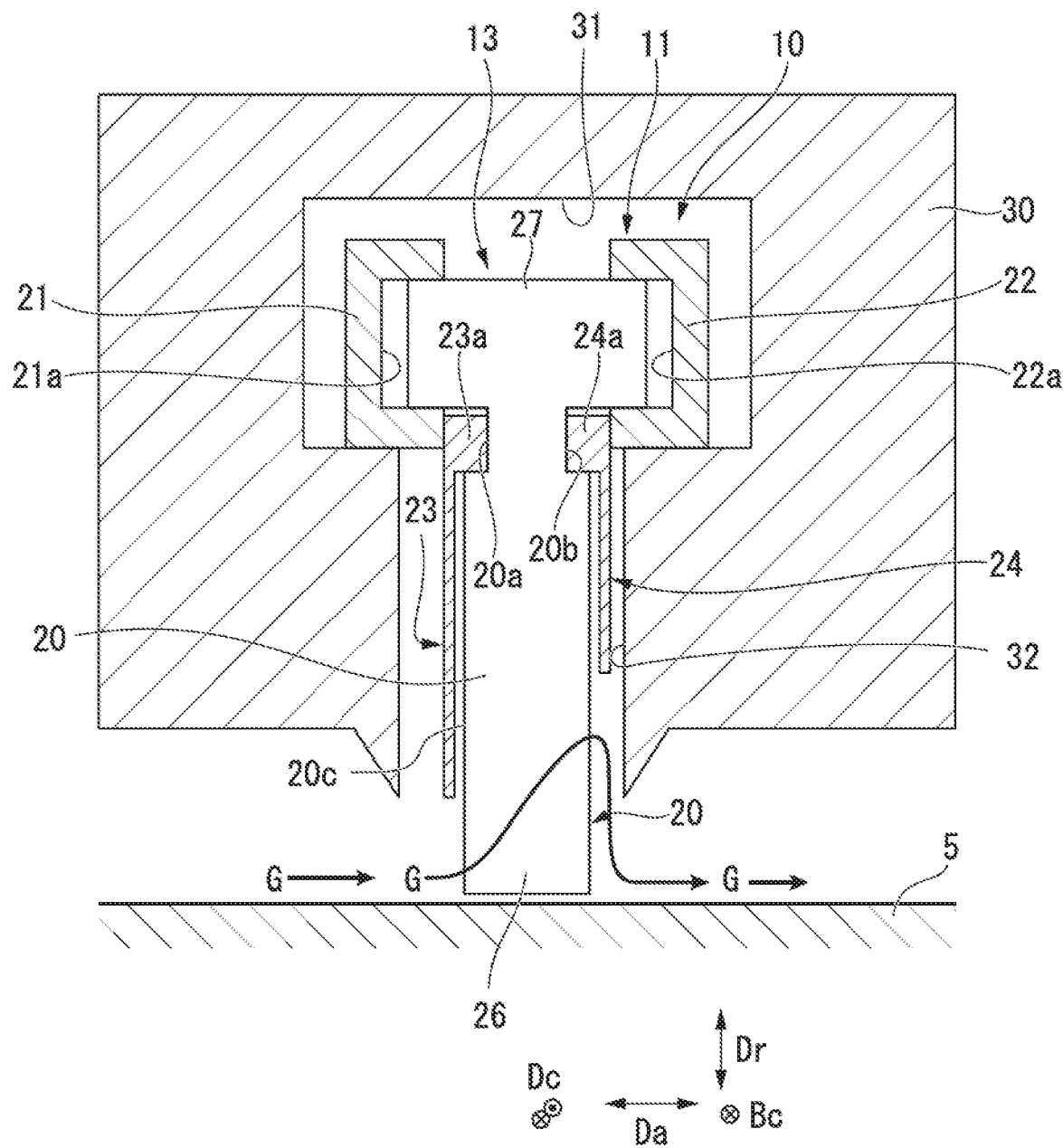
FIG. 3 is a cross-sectional view in a circumferential direction of a seal segment and a housing according to the first embodiment of the present invention.

The configuration of each seal segment 11 will be described with reference to FIG. 3. A cut position of the cross section of the shaft seal device 10 shown in FIG. 3 corresponds to a position of the line shown in the shaft seal device 10 of FIG. 2.

Each seal segment 11 is inserted into a housing (corresponding to the turbine vanes 6, the turbine blades 7 and the bearing portions 8a and 9a) 30 and installed to prevent leakage of the working fluid in the annular space between the rotor 5 and a housing 30.

The seal segment 11 includes a seal body 13, retainers 21 and 22, a high-pressure side plate 23, and a low-pressure side plate 24.

The seal body 13 includes a plurality of thin plate seal pieces 20 which are metallic members laminated in multiple layers at small intervals in the circumferential direction Dc.

The plurality of thin plate seal pieces 20 are laminated in the circumferential direction Dc (the rotational direction Bc) in a partial region of the rotor 5 in the circumferential direction Dc, and have a circular arc band shape as a whole when viewed in the axial direction Da.

The retainers 21 and 22 are configured to sandwich the thin plate seal pieces 20 from both sides at outer circumferential side proximal ends 27 of the thin plate seal pieces 20. The cross-sections of the retainers 21 and 22 in the circumferential direction Dc are formed in substantially a C shape. Further, the cross-sections of the retainers 21 and 22 in the axial direction Da are formed in a circular arc band shape.

The high-pressure side plate 23 is sandwiched between an edge end on the high-pressure side facing the high-pressure side region of the thin plate seal piece 20 and the retainer 21. Therefore, the high-pressure side plate 23 extends in the radial direction Dr and the circumferential direction Dc to cover the high-pressure side surface of the plurality of thin plate seal pieces 20 from the high-pressure side in the axial direction Da.

The low-pressure side plate 24 is sandwiched between an edge end on the low-pressure side facing the low-pressure side region of the thin plate seal pieces 20 and the retainer 22. Therefore, the low-pressure side plate 24 extends in the radial direction Dr and the circumferential direction Dc to cover the low-pressure side surfaces of the plurality of thin plate seal pieces 20 from the low-pressure side in the axial direction Da.

In the seal body 13 configured as described above, the thin plate seal pieces 20 are made of thin steel plates having substantially T shapes in which a width (a width in the axial direction Da) on the inner circumferential side is smaller than a width (a width in the axial direction Da) of the outer circumferential side proximal end 27. At both side edges thereof, notched portions 20a and 20b are formed at positions at which the width is small.

A plurality of adjacent thin plate seal pieces 20 are fixedly connected to each other at the outer circumferential side proximal end 27 by, for example, welding.

The thin plate seal pieces 20 have a predetermined rigidity based on the plate thickness in the circumferential direction Dc. Further, the thin plate seal pieces 20 are fixed to the retainers 21 and 22 so that an angle formed between the thin plate seal pieces 20 and the circumferential surface of the rotor 5 toward the rotational direction Bc is an acute angle.

Therefore, the thin plate seal pieces 20 extend toward the front side in the rotational direction Bc toward the inner side in the radial direction Dr.

In the seal segment 11 configured as described above, when the rotor 5 is stationary, the leading ends of the respective thin plate seal pieces 20 come into contact with the rotor 5. When the rotor 5 rotates, due to the dynamic pressure effect generated by the rotation of the rotor 5, the leading ends of the thin plate seal pieces 20 float from the outer periphery of the rotor 5 and are come out of contact with the rotor 5. Therefore, in the seal segment 11, abrasion of each thin plate seal piece 20 is suppressed, and the life of the seal is prolonged.

The high-pressure side plate 23 has a fitting stepped portion 23a on the outer circumferential side. The width of the fitting stepped portion 23a in the axial direction Da is greater than the width of the high-pressure side plate 23 in the axial direction Da on the inner circumferential side.

The low-pressure side plate 24 has a fitting stepped portion 24a on the outer circumferential side. The width of the fitting stepped portion 24a in the axial direction Da is greater than the width of the low-pressure side plate 24 in the axial direction Da on the inner circumferential side.

The fitting stepped portions 23a and 24a are fitted into the notched portions 20a and 20b of the thin plate seal pieces 20, respectively.

Further, the retainer 21 has a recessed groove 21a on the surface facing one side edge (the side edge on the high-pressure side) of the outer circumferential side proximal end 27 of the plurality of thin plate seal pieces 20. The retainer 22 has a recessed groove 22a on the surface facing the other side edge (the side edge on the low-pressure side) of the outer circumferential side proximal end 27 of the plurality of thin plate seal pieces 20. The fitting stepped portion 23a of the high-pressure side plate 23 and the fitting stepped portion 24a of the low-pressure side plate 24 are fitted into the notched portions 20a and 20b, respectively. One side edge (the side edge on the high-pressure side) on the outer circumferential side of the plurality of thin plate seal pieces 20 fitted with the fitting, stepped portion 23a and the fitting stepped portion 24a is fitted into the recessed groove 21a of the retainer 21. Further, the other side edge (the side edge on the low-pressure side) on the outer circumferential side thereof is fitted into the recessed groove 22a of the retainer 22. With such a configuration, the respective thin plate seal pieces 20 are fixed to the retainers 21 and 22.

An annular recessed groove 31 is formed in the inner circumferential wall surface of the housing 30. The annular recessed groove 31 has a shape in which a stepped portion is provided on the side surface facing one side edge (the side edge on the high-pressure side) of the thin plate seal pieces 20 and the other side edge (the side edge on the low-pressure side) such that the width on the outer circumferential side is greater than the width on the inner circumferential side in the axial direction of the rotor 5. Further, the thin plate seal pieces 20, the retainers 21 and 22, the high-pressure side plate 23 and the low-pressure side plate 24 are fitted into the recessed groove 31 of the housing 30 such that the surfaces facing the inner circumferential side of the retainers 21 and 22 are brought into contact with surfaces facing the outer circumferential side in the step. Inner circumferential side end portions 26 of the thin plate seal pieces 20 protrude toward the rotor 5 side from the high-pressure side plate 23. On the other hand, the inner circumferential side end portions 26 of the thin plate seal pieces 20 protrude toward the rotor 5 side from the low-pressure side plate 24, but a protruding amount thereof is set to be greater than that of the high-pressure side. That is, the thin plate seal pieces 20 are more greatly exposed to the working fluid G on the low-pressure side than on the high-pressure side. In other words, the high-pressure side plate 23 shields a wider area on the side surface of the thin plate seal pieces 20 from the working fluid G The high-pressure-side plate 23 is brought into close contact with the side surfaces 20c of the thin plate seal pieces 20 by the pressure caused by the flow of the working fluid G, thereby preventing the working fluid G from greatly flowing into the gaps between the plurality of thin plate seal pieces 20. Therefore, the high-pressure side plate 23 creates an upward flow from the inner circumferential side end portion 26 toward the outer circumferential side proximal end 27 in the gap portions between the plurality of thin plate seal pieces 20, thereby causing the inner circumferential side end portion 26 of the thin plate seal pieces 20 to float by the fluid force and come out of contact.

Further, the low-pressure side plate 24 is pushed by the high-pressure side plate 23 and the thin plate seal pieces 20 to come into close contact with a low-pressure side wall surface 32 of the inner circumferential wall surface of the housing 30. Since an inner diameter of the low-pressure side plate 24 is greater than that of the high-pressure side plate 23, the flow in the gaps between the plurality of thin plate seal pieces 20 has flowing conditions that make floating easy.

The seal segment 11 of the present embodiment further includes a block body 50 at the front end portion of the seal body 13 in the rotational direction Bc.

The structure of the block body 50 and the surroundings thereof will be described with reference to FIGS. 4 to 8.

The block body 50 is a metal member. The block body 50 includes retainer simulation sections 51 and 52 extending further from end portions of the retainers 21 and 22 in the circumferential direction Dc, and a seal body simulation section 53 extending inward in the radial direction Dr from the retainer simulation sections 51 and 52.

In the present embodiment, the retainer simulation sections 51 and 52 extend only from the end portion of the front side in the rotational direction Be among the end portions of the retainers 21 and 22 in the circumferential direction Dc.

Further, the seal segment 11 of the present embodiment includes an adjusting thin plate seal piece 40 at an end portion on the rear side in the rotational direction Be among the end portions of the retainers 21 and 22 in the circumferential direction Dc. Since the adjusting thin plate seal piece 40 is exposed from the retainers 21 and 22 and parts thereof can be sequentially peeled off, the adjusting thin plate seal piece 40 is adjusted to a required number of thin plate seal pieces, depending on the gap which is the separating part between the respective seal segments 11. The adjusting thin plate seal piece 40 with the adjusted number shields the gap of the divided part between the respective seal segments 11.

Figure 4:
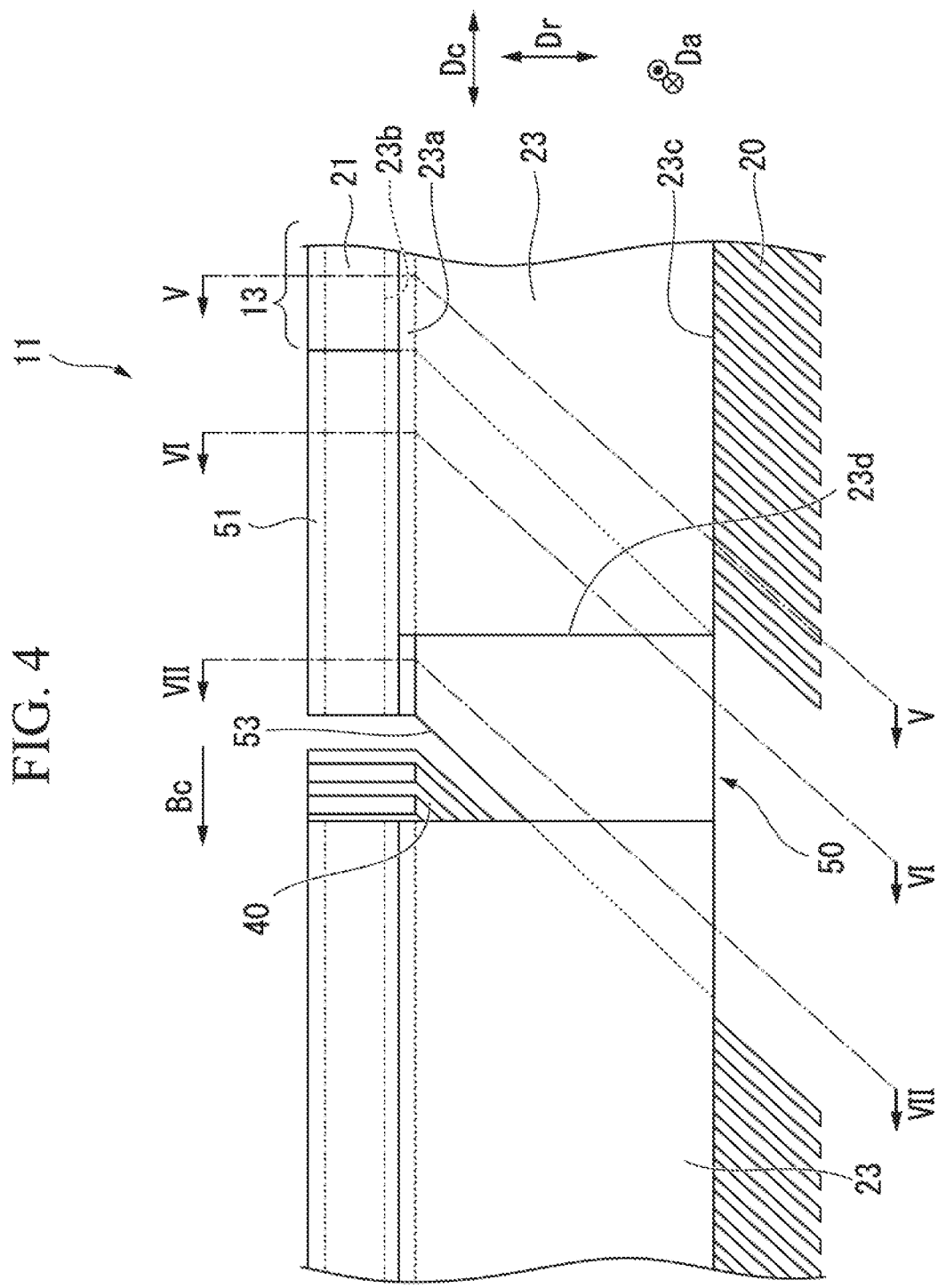
FIG. 4 is a side view of essential parts of the seal segment according to the first embodiment of the present invention as seen from an axial direction.

As shown in FIG. 4, the high-pressure side plate 23 extends in the radial direction Dr and the circumferential direction Dc to cover the high-pressure side surfaces of the plurality of thin plate seal pieces 20 as described above. Further, the high-pressure side plate 23 has an outer diameter side edge portion 23b which is an edge portion on the outer side in the radial direction Dr and extends in a circular arc shape in the circumferential direction Dc, and an inner diameter side edge portion 23c which is an edge portion on the inner side in the radial direction Dr and extends in a circular arc shape in the circumferential direction Dc.

Further, the high-pressure side plate 23 has a front edge portion 23d which is an edge portion on the front side in the rotational direction Be, extends from the outer diameter side edge portion 23b toward the inner side in the radial direction Dr, and is connected to the inner diameter side edge portion 23c.

In a case of the present embodiment, the front edge portion 23d extends in the radial direction Dr.

Although it is not shown in FIG. 4, the low-pressure side plate 24 also extends in the radial direction Dr and the circumferential direction Dc to cover the high-pressure side surfaces of the plurality of thin plate seal pieces 20 as described above. Furthermore, the low-pressure side plate 24 also has an outer diameter side edge portion which is an outer edge portion in the radial direction Dr and extends in a circular arc shape in the circumferential direction Dc, and an inner diameter side edge portion which is an inner edge portion in the radial direction Dr and extends in a circular arc shape in the circumferential direction Dc.

Further, the low-pressure side plate 24 also has a front edge portion which is a front edge portion in the rotational direction Bc, extends inward in the radial direction Dr from the outer diameter side edge portion, and is connected to the inner diameter side edge portion.

The high-pressure side plate 23 covers at least a part of the seal body simulation section 53 on the high-pressure side in the axial direction Da, and the low-pressure side plate 24 covers at least a part of the seal body simulation section 53 on the low-pressure side in the axial direction Da.

The seal body simulation section 53 extends to a position aligned with the inner diameter side edge portion 23c of the high-pressure side plate 23 in the radial direction Dr. Therefore, the seal body simulation section 53 is not in contact with the rotor 5.

Figure 5:
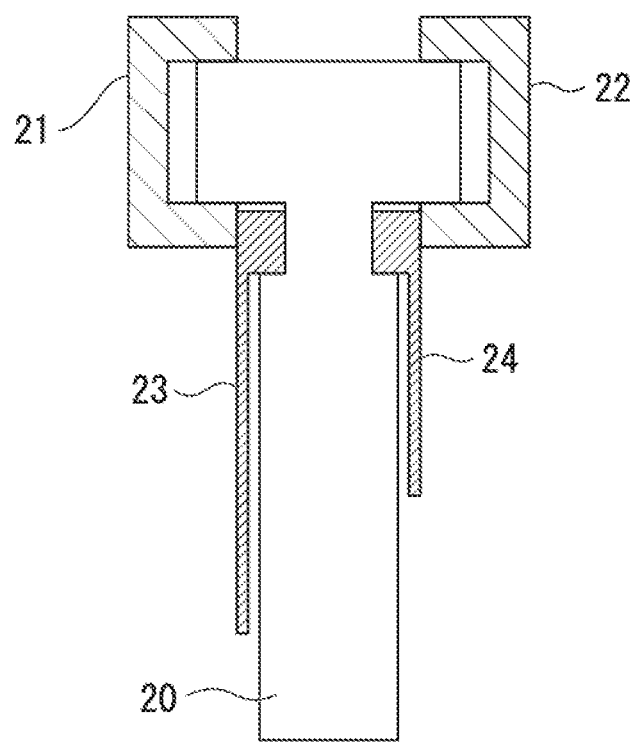
FIG. 5 is a cross-sectional view taken along the line V-V in FIG. 4.
Figure 6:
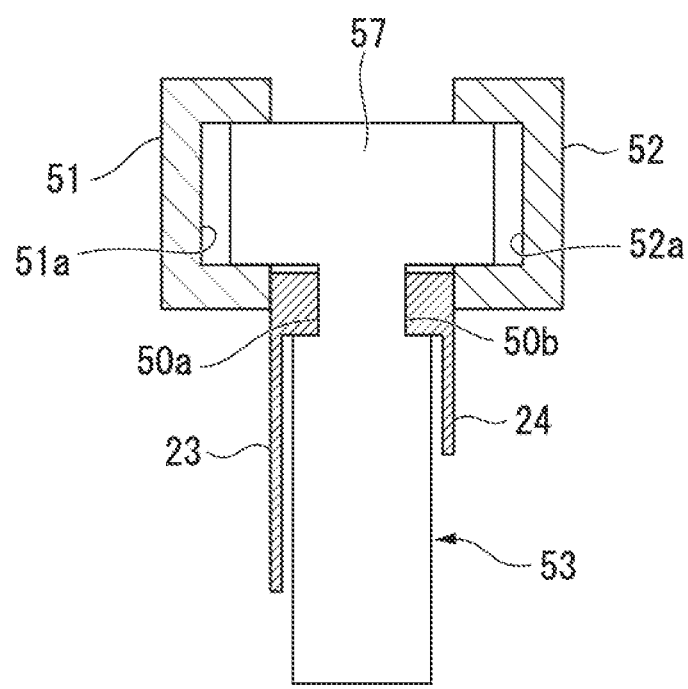
FIG. 6 is a cross-sectional view taken along the line VI-VI in FIG. 4.

As shown in FIGS. 5 and 6, the retainer simulation sections 51 and 52 have shapes and dimensions substantially similar to those of the retainers 21 and 22, except that the lengths in the circumferential direction Dc are different.

That is, the retainer simulation sections 51 and 52 are configured to sandwich the seal body simulation section 53 from both sides in the axial direction Da at the outer circumferential side proximal end 57 of the seal body simulation section 53.

Further, since the cross sections of the retainer simulation sections 51 and 52 in the circumferential direction Dc are formed in a substantially C shape, the retainer simulation sections 51 and 52 are provided with a recessed groove 51a and a recessed groove 52a extending in the circumferential direction.

Further, in the present embodiment, the cross sections in the axial direction Da of the retainer simulation sections 51 and 52 are formed in a circular arc band shape.

Figure 7:
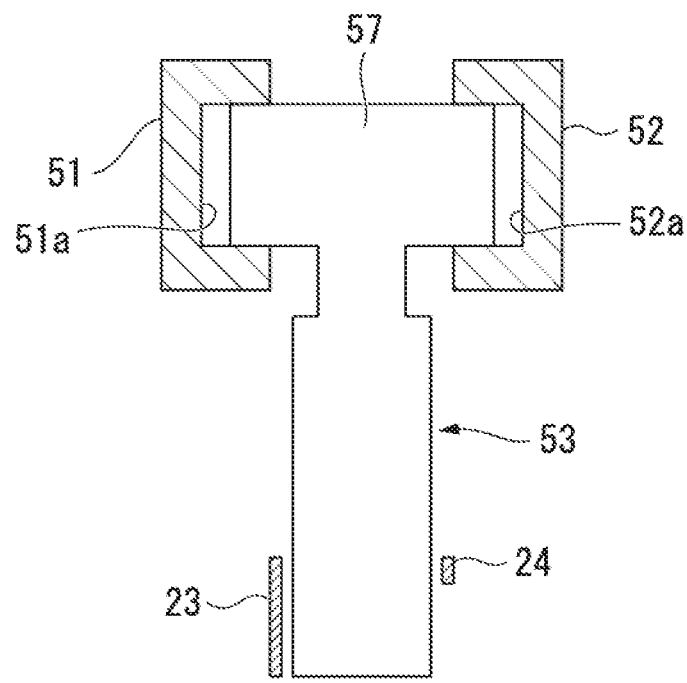
FIG. 7 is a cross-sectional view taken along line VII-VII in FIG. 4.
Figure 8:
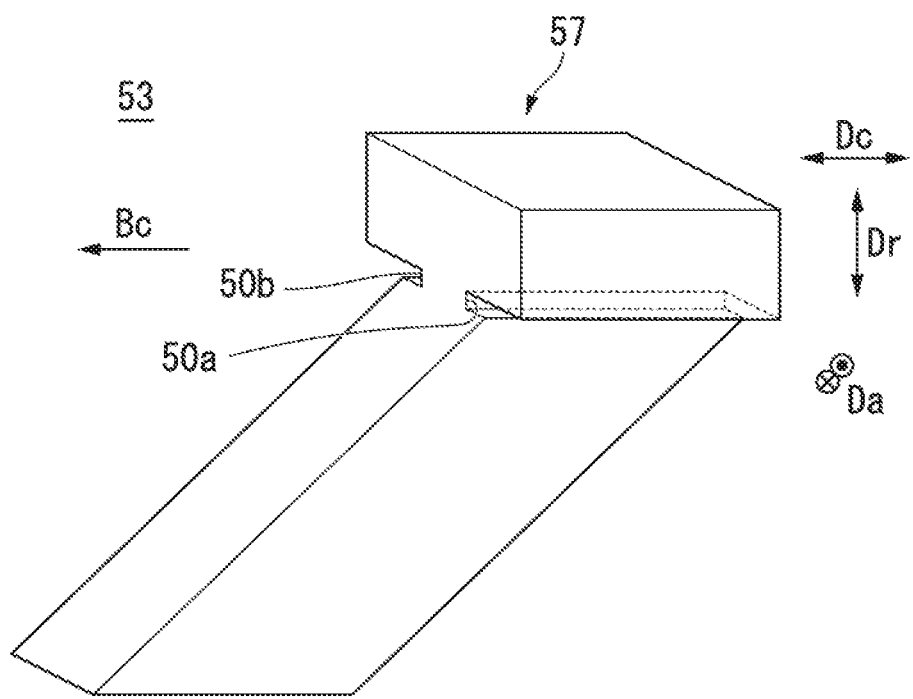
FIG. 8 is a perspective view of a block body according to the first embodiment of the present invention.

As shown in FIGS. 7 and 8, the seal body simulation section 53 has a shape similar to the contour shape of the whole of the plurality of thin plate seal pieces 20 laminated in multiple layers in the circumferential direction Dc, except that the length in the circumferential direction Dc and the length extending inward in the radial direction Dr are different.

That is, the seal body simulation section 53 extends in the circumferential direction Dc, has a circular arc band shape when viewed in the axial direction Da, and has a substantially T-shaped three-dimensional shape in which the width on the inner circumferential side (the width in the axial direction Da) is smaller than the width (width in the axial direction Da) of the outer circumferential side proximal end 57 in the cross section in the circumferential direction Dc. Further, on both side surfaces of the seal body simulation section 53 in the axial direction Da, notched grooves 50a and 50b are formed at positions at which the width thereof is small.

Further, as shown in FIG. 8, the seal body simulation section 53 is a block having a plurality of (for example, three or more) thin plate seal pieces 20 in the circumferential direction Dc.

The seal body simulation section 53 is fitted between the high-pressure side plate 23 and the low-pressure side plate 24 toward the end portion in the circumferential direction Dc of the retainers 21 and 22, and is fitted between the retainer simulation sections 51 and 52. Therefore, the seal body simulation section 53 is fitted like a cap to the front end surface of the seal body 13 in the rotational direction Bc to protect the thin plate seal piece 20.

Further, the notched grooves 50a and 50b are fitted to the fitting stepped portions 23a and 24a, respectively.

Therefore, the seal body simulation section 53 is fitted between the high-pressure side plate 23 and the low-pressure side plate 24, and is able to slide in the circumferential direction Dc, while being restricted in the radial direction Dr, when fitted between the retainer simulation sections 51 and 52.

Both side surfaces of the seal body simulation section 53 facing the circumferential direction Dc are inclined surfaces such that an angle formed between each side surface of the seal body simulation section 53 facing the circumferential direction Dc and the circumferential surface of the rotor 5 facing the rotational direction Bc is an acute angle.

Therefore, both side surfaces of the seal body simulation section 53 facing the circumferential direction Dc extend toward the front side in the rotational direction Bc going inward in the radial direction Dr.

The inclination of both side surfaces of the seal body simulation section 53 facing the circumferential direction Dc may be that of any inclined surface as long as it is an inclined surface that substantially follows the inclination of the plate surface of the thin plate seal piece 20. As a modified example, the inclination of both side surfaces of the seal body simulation section 53 facing the circumferential direction Dc may be simulated and inclined to follow the inclination of the plate surface of the thin plate seal piece 20 when a preload is applied to the thin plate seal piece 20. As another modified example, both side surfaces of the seal body simulation section 53 facing the circumferential direction Dc may be curved surfaces as long as both side surfaces follow the plate surface of the thin plate seal piece 20.

The operations and effects of the block body 50 provided with the seal body simulation section 53 will be described.

In the present embodiment, a seal body simulation section 53 made of a metal block is provided at the end portion of the seal member 13 in the rotational direction Bc, the end portion which is a divided part between the seal segments 11, that is, a divided part between the high-pressure side plates 23 of the seal segments 11 adjacent to each other in the circumferential direction Dc.

When the abrasion of the seal body simulation section 53 does not cause a problem, as a modified example, the seal body simulation section 53 may be a metal block having a cavity inside, and as another modified example, the seal body simulation section 53 may be a metallic box type block.

Therefore, rather than the thin plate seal piece, the seal body simulation section 53 which is not in contact with the rotor 5 is provided in the divided part between the seal segments 11. Thus, since it is not necessary to provide the thin plate seal piece in the divided part between the seal segments 11, the abrasion of the thin plate seal piece is suppressed.

On the other hand, since a thin plate seal piece is provided inside the end portion of the seal segment 11 in the circumferential direction Dc, the performance of the floating characteristics of the thin plate seal piece is maintained.

In addition, since the seal body simulation section 53 fits like a cap to the end surface in the circumferential direction Dc of the seal body 13, the seal body simulation section 53 protects the thin plate seal piece 20.

Since the seal body simulation section 53 has a plurality of thicknesses of the thin plate seal piece 20 in the circumferential direction Dc, the seal body simulation section 53 is thicker in the circumferential direction Dc than the thin plate seal piece 20 and has high rigidity. Therefore, the abrasion in the divided part between the seal segments 11 is suppressed, and fluttering occurring in the thin plate seal piece 20 can be suppressed.

Furthermore, the seal segment 11 of the present embodiment covers at least a part of the seal body simulation section 53 on the high-pressure side in the axial direction Da by the high-pressure side plate 23, and the seal segment 11 covers at least a part of the seal body simulation section 53 on the low-pressure side in the axial direction Da by the low-pressure side plat 24. The operations and effects of such a configuration will be described in detail below.

A case in which a thin plate seal piece is provided instead of the seal body simulation section 53 at the front end portion of the seal body 13 in the rotational direction Bc will be considered. In this case, it is hard for the front edge portion 23d of the high-pressure side plate 23 to come into close contact with the side surface of the thin plate seal piece, and the working fluid G flows around to the inside in front of the high-pressure side plate 23 in the rotational direction Bc. When the working fluid G flows around, the flow of the working fluid G in the axial direction Da also leaks into the thin plate seal piece covered with the high-pressure side plate 23.

Therefore, there is a likelihood that fluttering will occur in the thin plate seal piece near the front edge portion 23d of the high-pressure side plate 23.

In contrast, in the seal segment 11 of the present embodiment, as described above, the seal body simulation section 53 is provided at the front end portion of the seal body 13 in the rotational direction Bc. That is, the high-pressure side plate 23 further extends from the side surfaces of the plurality of thin plate seal pieces 20 to cover at least a part of the seal body simulation section 53 on the high-pressure side in the axial direction Da.

When at least a part of the high-pressure side of the seal body simulation section 53 in the axial direction Da is covered, even if the working fluid G reaches the inside of the high-pressure side plate 23 in the axial direction Da, the working fluid G only flows into the vicinity of the seal body simulation section 53. Therefore, the working fluid G is hard to flow into the plurality of thin plate seal pieces 20.

Therefore, in the seal segment 11 of the present embodiment, since the working fluid G can be prevented from flowing around the plurality of thin plate seal pieces 20, the flow of the working fluid G in the axial direction Da is hard to leak, and occurrence of fluttering in the piece 20 can be suppressed in the plurality of thin plate seal pieces.

In addition, in the present embodiment, the rear part in the rotational direction Bc on the high-pressure side of the seal body simulation section 53 in the axial direction Da is covered with the front part of the high-pressure side plate 23 in the rotational direction Bc.

If the rear part of the seal body simulation section 53 in the rotational direction Bc is covered with the front part of the high-pressure side plate 23 in the rotational direction Bc, the degree of freedom of the plate surface shape of the front part of the high-pressure side plate 23 in the rotational direction Bc increases.

Therefore, the plate surface shape on the front side of the high-pressure side plate 23 in the rotational direction Bc does not necessarily need to match the side surface shape of the plurality of thin plate seal pieces in the axial direction Da or the side surface shape of the seal body simulation section 53 in the axial direction Da. In other words, the plate surface shape of the high-pressure side plate 23 on the front side in the rotational direction Bc does not need to be a plate surface shape in which an angle formed between the front edge portion 23d and the circumferential surface of the rotor 5 is an acute angle.

In the case of the present embodiment, by setting the shape of the high-pressure side plate 23 to a shape in which the front edge portion 23d extends along the radial direction Dr, the angle in the rotational direction Bc formed between the front edge portion 23d and the circumferential surface of the rotor 5 increases.

Therefore, as the acute angle of the plate surface shape increases, since the rigidity of the high-pressure side plate 23 increases, fluttering is suppressed on the high-pressure side plate 23.

The seal segments 11 of the present embodiment are excellent as described below in view of maintaining quality and production efficiency.

In the seal segment 11 of the present embodiment, the seal body simulation section 53 of the small portion can be fitted into most of the seal bodies 13 manufactured by a normal manufacturing process. That is, after most of the seal segments 11 are manufactured with a large number of thin plate seal pieces having the same plate thickness, the seal body simulation section 53 can be provided only at the end portion in the circumferential direction Dc.

Therefore, since the seal body simulation section 53 is provided only in the vicinity of the divided part of the seal segment 11, while maintaining the manufacturing process of assembling the thin plate seal pieces of the same plate thickness (which is a normal manufacturing process), the quality is maintained and the production efficiency is improved.

Second Embodiment

Figure 9:
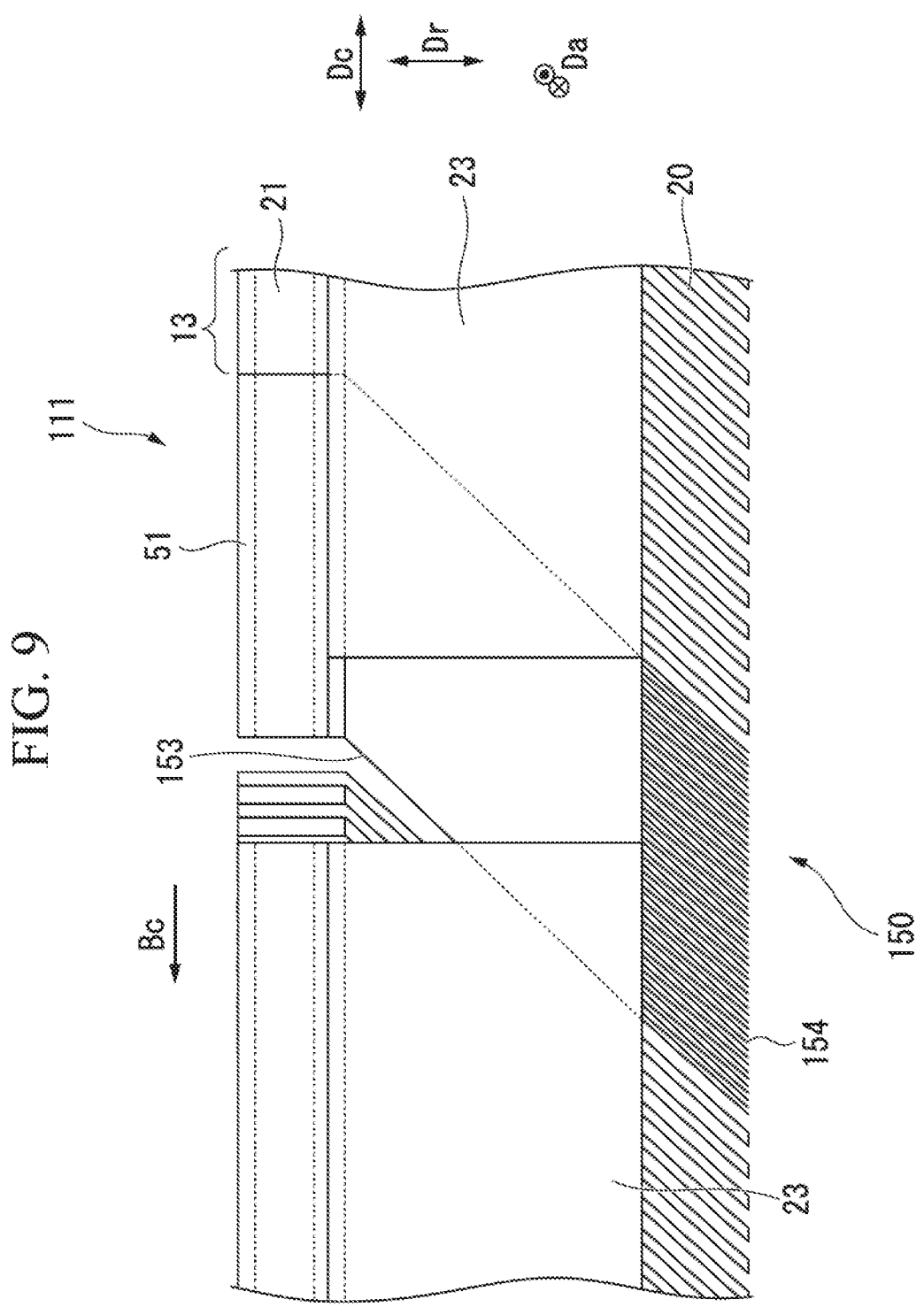
FIG. 9 is a side view of essential parts of a seal segment according to a second embodiment of the present invention as seen from the axial direction.

Hereinafter, a second embodiment of the present invention will be described with reference to FIG. 9.

The seal segment of the present embodiment is basically the same as the first embodiment, except that the seal body simulation section is provided with a contact seal.

A seal segment 111 of the present embodiment further includes a block body 150 at the front end portion of the seal body 13 in the rotational direction Bc.

The structure of the block body 150 and its surroundings will be described with reference to FIG. 9.

The block body 150 includes retainer simulation sections 51 and 52 extending further in the circumferential direction Dc from the front end portion of the retainers 21 and 22 in the rotational direction Bc, a seal body simulation section 153 extending to the inside from the retainer simulation sections 51 and 52 in the radial direction Dr, and a contact seal 154.

The contact seal 154 is provided on the seal body simulation section 153, extends inward in the radial direction Dr from the inner end of the seal body simulation section 153 in the radial direction Dr, and fills the gap between the inner end of the seal body simulation section 153 in the radial direction Dr and the rotor 5.

Furthermore, the seal body simulation section 153 is a block having a plurality of (for example, three or more) thin plate seal pieces 20 in the circumferential direction Dc.

In the present embodiment, a brush seal is used for the contact seal 154.

Since the seal body simulation section 153 has a block shape, it cannot be brought into direct contact with the circumferential surface of the rotor 5. Therefore, it is necessary to provide a gap between the inner end of the seal body simulation section 153 in the radial direction Dr and the rotor 5, and the working fluid G leaks considerably.

In the present embodiment, since the contact seal 154 is used, the inner end of the seal body simulation section 153 in the radial direction Dr does not come into contact with the rotor 5. Therefore, a gap can be filled between the inner end of the seal body simulation section 153 in the radial direction Dr and the rotor 5. Therefore, leakage of the working fluid G can be suppressed.

Further, when a brush seal, which uses a sealing method having high followability to deviation of the axis Ax of the rotor 5, is used for the sealing method using a thin plate seal piece which is a sealing method having a high followability to deviation of the axis Ax of the rotor 5, it is possible to provide a seal having high followability to the deviation of the axis Ax of the rotor 5 as a whole. As a modified example, when followability to the deviation of the axis Ax of the rotor 5 is not required, it is also possible to provide a labyrinth seal or the like on the contact seal 154.

Third Embodiment

Figure 10:
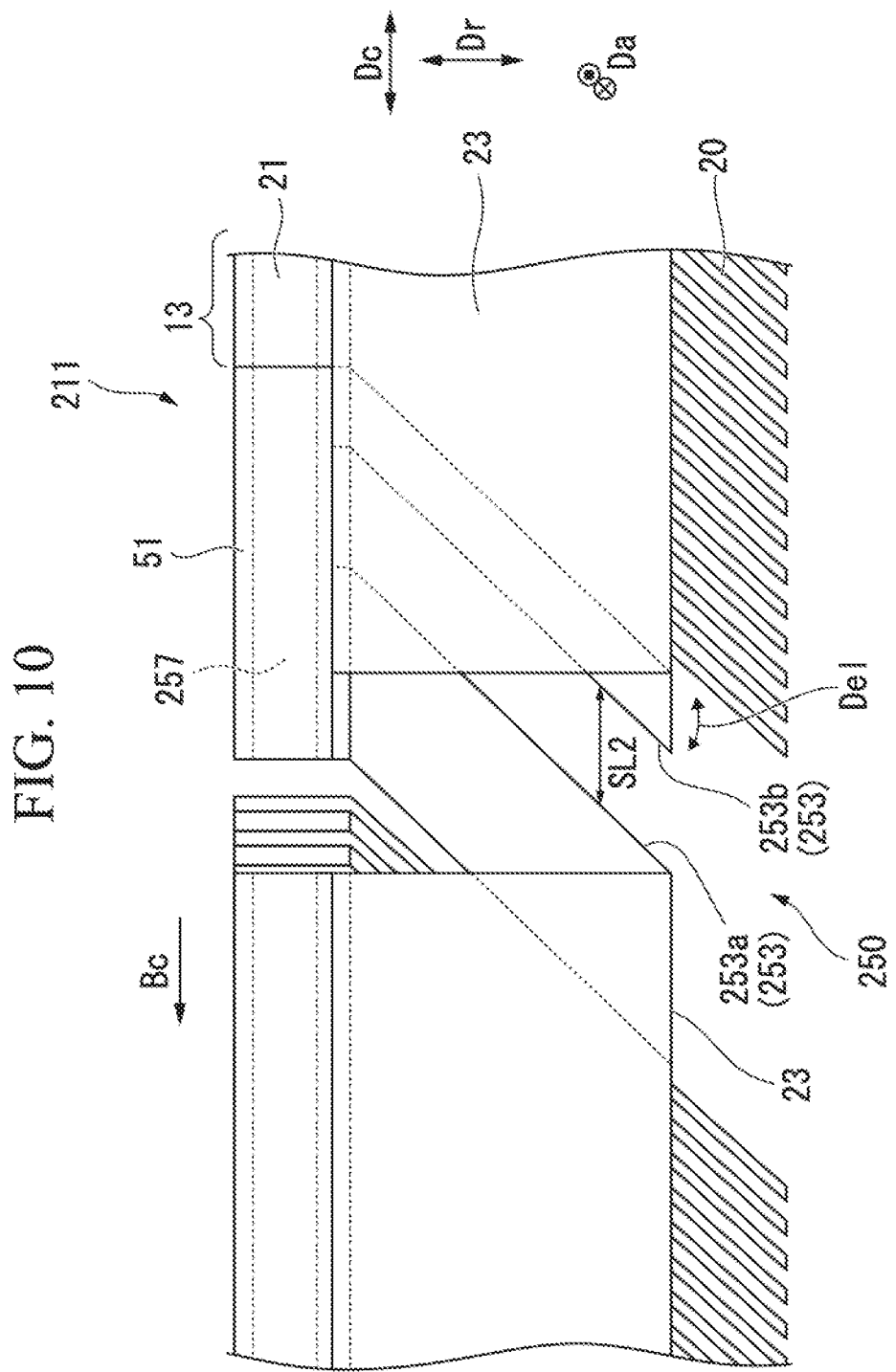
FIG. 10 is a side view of essential parts of a seal segment according to a third embodiment of the present invention as seen from the axial direction.

Hereinafter, a third embodiment of the present invention will be described with reference to FIG. 10.

The seal segment of the present embodiment is basically the same as the first embodiment, except that the seal body simulation section is divided into a main seal body simulation section and an auxiliary seal body simulation section.

A seal segment 211 of the present embodiment further includes a block body 250 at the front end portion of the seal body 13 in the rotational direction Bc.

The structure of the block body 250 and its surroundings will be described with reference to FIG. 10.

The block body 250 has retainer simulation sections 51 and 52 further extending in the circumferential direction Dc from the front end portions of the retainers 21 and 22 in the rotational direction Bc, and a seal body simulation section 253 extending inward in the radial direction Dr from the retainer simulation sections 51 and 52.

The seal body simulation section 253 includes a main seal body simulation section 253a and an auxiliary seal body simulation section 253b that protrude from the outer circumferential side proximal end 257 and extend inward in the radial direction. The seal body simulation section 253 has a slit SL2 extending inward in the radial direction Dr from the inner circumferential end of the outer circumferential side proximal end 257 in the radial direction Dr. The seal body simulation section 253 has a shape in which a part of the blocks having a plurality of (for example, three or more) thicknesses of the thin plate seal piece 20 is divided into the main seal body simulation section 253a and the auxiliary seal body simulation section 253b by the slit SL2 in the circumferential direction Dc.

In the present embodiment, the auxiliary seal body simulation section 253b decreases the rigidity in the circumferential direction Dc, for example, by decreasing the thickness in the circumferential direction Dc, as compared with the main seal body simulation section 253a. By decreasing the rigidity with respect to the circumferential direction Dc, the auxiliary seal body simulation section 253b has elasticity in a swinging direction Del along the circumferential direction Dc with respect to the outer circumferential side proximal end 257 and can be bent. Thus, the auxiliary seal body simulation section 253b is deformed to follow the behavior of the thin plate seal piece 20. Therefore, the auxiliary seal body simulation section 253b does not hinder the floating of the thin plate seal piece 20.

Since the leakage of the working fluid G from the slit SL2 increases as the width of the slit SL2 in the circumferential direction Dc increases, the width of the slit SL2 in the circumferential direction Dc is made as small as possible.

In the present embodiment, the thickness of the auxiliary seal body simulation section 253b in the circumferential direction Dc is set to be smaller than that in the main seal body simulation section 253a. However, as a modified example, the thickness of the main body simulation section 253a in the circumferential direction Dc may be set to be smaller than the auxiliary seal body simulation section 253b. In this case, by bending the main seal body simulation section 253a in the swinging direction Del, it is possible to cause the seal body simulation section 253 to follow the behavior of the thin plate seal piece 20 of the seal segment 211 adjacent to the front in the rotational direction Bc.

Fourth Embodiment

Figure 11:
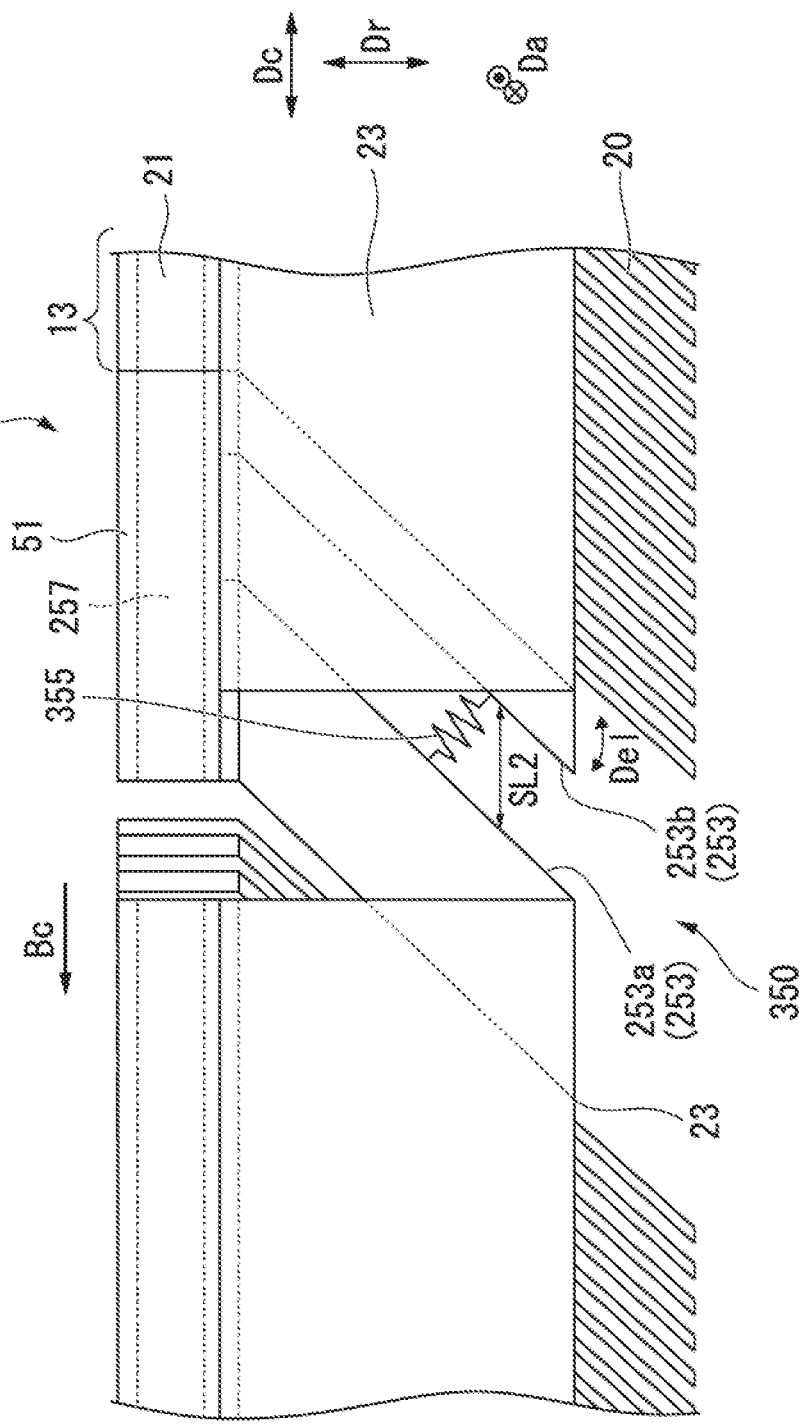
FIG. 11 is a side view of essential parts of a seal segment according to a fourth embodiment of the present invention as seen from the axial direction.

Hereinafter, a fourth embodiment of the present invention will be described with reference to FIG. 11.

A seal segment of the present embodiment is basically the same as that of the third embodiment, except that the seal segment includes an elastic member at the slit.

A seal segment 311 of the present embodiment further includes a block body 350 at the front end portion of the seal body 13 in the rotational direction Bc.

The structure of the block body 350 and the surroundings thereof will be described with reference to FIG. 11.

The block body 350 of the present embodiment includes an elastic member 355 between the main seal body simulation section 253a and the auxiliary seal body simulation section 253b. The elastic member 355 is, for example, a spring element and uses a coil spring, a plate spring, or the like.

In addition to the elasticity of the auxiliary seal body simulation section 253b itself, due to the elasticity of the elastic member, the auxiliary seal body simulation section 253b has elasticity in the swinging direction Del along the circumferential direction Dc with respect to the outer circumferential side proximal end 257 and can be bent. Therefore, the auxiliary seal body simulation section 253b is deformed to follow the behavior of the thin plate seal piece 20. Therefore, the auxiliary seal body simulation section 253b does not hinder floating of the thin plate seal piece 20.

Furthermore, in the present embodiment, by adjusting the elastic coefficient of the elastic member, bending of the auxiliary seal body simulation section 253b is adjusted to follow the behavior of the thin plate seal piece 20.

In the present embodiment, only one elastic member 355 is provided, but the elastic member 355 may be provided at a plurality of positions along the slit SL2.

Although the embodiments of the present invention have been described in detail with reference to the drawings, specific configurations are not limited to the above embodiments, and design changes and the like within the scope not departing from the gist of the present invention are also included.

The number of seal segments provided in the shaft seal device of the present embodiment is eight, but the number is not limited thereto and may be any one of two to seven or nine or more.

In the present embodiment, the adjusting thin plate seal piece 40 is provided, but when it is not necessary to shield the gap of the divided part between the seal segments, the adjusting thin plate seal piece 40 may not be provided.

In the present embodiment, the rear end portions of the retainer simulation sections 51 and 52 in the rotational direction Bc and the front end portions of the retainers 21 and 22 in the rotational direction Bc are joined by welding or brazing, but they may be joined together by screwing. As a modified example, instead of joining the retainers 21 and 22 to the retainer simulation section 51 and 52, the retainer simulation section 51 and the retainer 21 may be integrally formed, and the retainer simulation section 52 and the retainer 22 may be integrally formed.

In the present embodiment, among the end portions of the retainers 21 and 22 in the circumferential direction Dc, from the front end portion in the rotational direction Bc, the retainer simulation section 51 and 52 extend, and the retainer simulation sections 51 and 52 are provided at the front end portion of the rotational direction Bc. As a modified example, among the end portions of the retainers 21 and 22 in the circumferential direction Dc, from the rear end portions of the retainers 21 and 22 in the rotational direction Bc, the retainer simulation section 51 and 52 may be provided, and the retainer simulation section 51 and 52 may be provided on the rear end portion of the rotational direction Bc. In that case, various functions act on the thin plate seal piece 20 on the rear part in the rotational direction Bc.

INDUSTRIAL APPLICABILITY

The seal segment and the rotary machine described above can suppress the performance deterioration of the floating characteristics of the thin plate seal piece and the fluttering occurring in the thin plate seal piece.

REFERENCE SIGNS LIST

1 Gas turbine
2 Compressor
3 Combustor
4 Turbine
5 Rotor
6 Turbine vane
7 Turbine blade
8 Casing
8a Bearing portion
9 Casing
9a Bearing portion
10 Shaft seal device
11 Seal segment
12 Circumferential end portion
13 Seal body
°Thin plate seal piece
20a Notched portion
20b Notched portion
20c Side surface
21 Retainer
21a Recessed groove
22 Retainer
22a Recessed groove
23 High-pressure side plate
23a Fitting stepped portion
23b Outer diameter side edge portion
23c Inner diameter side edge portion
23d Front edge portion
24 Low-pressure side plate
24a Fitting stepped portion
26 Inner circumferential side end portion
27 Outer circumferential side proximal end
30 Housing
31 Recessed groove
32 Low-pressure side wall surface
50 Block body
50a Notched groove
50b Notched groove
51 Retainer simulation section
51a Recessed groove 52 Retainer simulation section
52a Recessed groove
53 Seal body simulation section
57 Outer circumferential side proximal end
111 Seal segment
150 Block body
153 Seal body simulation section
154 Contact seal
211 Seal segment
250 Block body
253 Seal body simulation section
253a Main seal body simulation section
253b Auxiliary seal body simulation section
257 Outer circumferential side proximal end
311 Seal segment
350 Block body
355 Elastic member
Ax Axis
Bc Rotational direction
Da Axial direction
Dc Circumferential direction
Del Swinging direction
Dr Radial direction
G Working fluid
SL2 Slit

The invention claimed is:

1. A seal segment comprising:
a retainer extending in a circumferential direction of a rotary shaft on an outer circumferential side of the rotary shaft;
a seal body extending inward in a radial direction from the retainer and having a plurality of thin plate seal pieces laminated in the circumferential direction;
a high-pressure side plate which is supported to be sandwiched between the seal body and the retainer and covers a high-pressure side in an axial direction of the seal body over the circumferential direction;
a low-pressure side plate which is supported to be sandwiched between the seal body and the retainer and covers a low-pressure side in the axial direction of the seal body over the circumferential direction; and
a block body comprising: a retainer simulation section further extending in the circumferential direction from an end portion of the retainer in the circumferential direction; and a seal body simulation section extending inward in the radial direction from the retainer simulation section and being a block having a thickness of three or more of the thin plate seal pieces in the circumferential direction, wherein
the high-pressure side plate and the low-pressure side plate cover at least a part of the seal body simulation section of the block body,
the seal body simulation section is fitted between the high-pressure side plate and the low-pressure side plate, and
the seal body simulation section is provided only at an end portion of the seal body in the circumferential direction.

2. The seal segment according to claim 1, wherein the seal body simulation section comprises a contact seal extending inward in the radial direction.

3. The seal segment according to claim 2, wherein the contact seal comprises a brush seal.

4. The seal segment according to claim 1, wherein the seal body simulation section is divided into a main seal body simulation section and an auxiliary seal body simulation section by a slit extending inward in the radial direction.

5. The seal segment according to claim 4, wherein the seal body simulation section comprises an elastic member between the main seal body simulation section and the auxiliary seal body simulation section.

6. A rotary machine comprising the seal segment according to claim 1.

7. The seal segment according to claim 2, wherein the seal body simulation section is divided into a main seal body simulation section and an auxiliary seal body simulation section by a slit extending inward in the radial direction.

8. The seal segment according to claim 3, wherein the seal body simulation section is divided into a main seal body simulation section and an auxiliary seal body simulation section by a slit extending inward in the radial direction.

9. The seal segment according to claim 7, wherein the seal body simulation section comprises an elastic member between the main seal body simulation section and the auxiliary seal body simulation section.

10. The seal segment according to claim 8, wherein the seal body simulation section comprises an elastic member between the main seal body simulation section and the auxiliary seal body simulation section.

11. A rotary machine comprising the seal segment according to claim 2.

12. A rotary machine comprising the seal segment according to claim 3.

13. A rotary machine comprising the seal segment according to claim 4.

14. A rotary machine comprising the seal segment according to claim 5.

15. A rotary machine comprising the seal segment according to claim 7.

16. A rotary machine comprising the seal segment according to claim 8.

17. A rotary machine comprising the seal segment according to claim 9.

18. A rotary machine comprising the seal segment according to claim 10.

19. The seal segment according to claim 1, wherein the seal body simulation section is provided at the same position in the axial direction as the seal body.

* * * * *